United States Patent [19]

Furuichi

[11] Patent Number: 4,628,387
[45] Date of Patent: Dec. 9, 1986

[54] READ/WRITE AND TRIM ERASE MAGNETIC HEAD ASSEMBLY

[75] Inventor: Shinji Furuichi, Kumagaya, Japan

[73] Assignee: Hitachi Metals, Inc., Tokyo, Japan

[21] Appl. No.: 464,858

[22] Filed: Feb. 8, 1983

[30] Foreign Application Priority Data

Feb. 10, 1982 [JP] Japan ................................. 57-19900

[51] Int. Cl.[4] ........................ G11B 5/265; G11B 5/325
[52] U.S. Cl. .................................. 360/121; 360/118
[58] Field of Search ............... 360/118, 119, 120, 121, 360/125

[56] References Cited

U.S. PATENT DOCUMENTS

| | | | |
|---|---|---|---|
| 3,562,443 | 2/1971 | Bos et al. | 179/100.2 |
| 3,736,657 | 6/1973 | Varadi et al. | 29/603 |
| 3,810,244 | 5/1974 | Hasegawa | 360/118 |
| 3,827,083 | 7/1974 | Hosaka et al. | 360/121 |
| 3,964,103 | 6/1976 | Thompson et al. | 360/129 |
| 4,176,384 | 11/1979 | Yang | 360/121 |
| 4,434,445 | 2/1984 | Van Herk | 360/121 |

OTHER PUBLICATIONS

T. Tang, "Stress Analysis of Glass–Bonded Ferrite Recording Heads" IBM Journal of Research and Development, May 1974.

*Primary Examiner*—Stuart N. Hecker
*Assistant Examiner*—Benjamin E. Urcia
*Attorney, Agent, or Firm*—Finnegan, Henderson, Farabow, Garrett & Dunner

[57] ABSTRACT

A magnetic head assembly for writing on and reading out data or signals from a magnetic medium such as a floppy disc, having a read-write magnetic head and eraser magnetic heads in combination. Control of the depth of the eraser gap in this magnetic head assembly is accomplished not by the eraser magnetic head core, but by the read-write magnetic head core.

6 Claims, 7 Drawing Figures

READ/WRITE AND TRIM ERASE MAGNETIC HEAD ASSEMBLY

BACKGROUND OF THE INVENTION

1. Field of the Invention

The present invention relates to magnetic head means and, more particularly to magnetic head means having a read-write magnetic head and two eraser magnetic heads.

2. Description of the Prior Art

An apparatus has been put into practical use, in which a magnetic head means is moved on a rotating magnetic medium in a direction perpendicular to that of the rotation thereof to successively read out and write in signals or data. For example, such apparatus have lately been widely used in floppy disk drives. The movement of the magnetic head means is caused by a known mechanism such as stepping motors means, linear motor means, hydraulic mechanism and so forth. The pitch of the magnetic head means movement, however, is not constant accurately. This means that, when signals written in a magnetic medium by one read-write magnetic head means are required to be read out by another means, high signal reproducibility is not always obtained because the magnetic head means of one apparatus cannot precisely trace the signal tracks written by another apparatus.

Under this circumstance, a system called "Straddle Erase System" has lately been widely used. In this system, eraser magnetic heads are disposed on opposite sides of a read-write magnetic head so that noises or the like recorded in portions of the magnetic medium adjacent to each signal track are erased by the eraser magnetic heads. Accordingly, clear signal reproduction is obtained. This system is disclosed, for example, in IBM Technical Disclosure Bulletin Vol. 3, NO. 2 (1965). In this system, a ferrite material is used in most cases as a magnetic head core in view of its resistance to wear.

On the other hand, it is desirable to reduce the read-write magnetic head core, as well as to reduce the size of the eraser head core in order to attain a high track density, i.e., a high TPI (Tracks per Inch) or large storage capacity. These requirements, however, impose new problems such as a difficulty in precise assembling of the head, difficulty in control of the eraser gap width, breakdown of the cores themselves, difficulty in manufacturing the eraser head core, and so on.

SUMMARY OF THE INVENTION

Accordingly, an object of the present invention is an improved magnetic head means which permits easy control of the eraser gap width and easy fabrication of the eraser magnetic head core.

To this end, according to the present invention, a magnetic head means is characterized in that the depth of the eraser gap for the eraser head is defined by the configuration of a read-write magnetic head core.

These and other objects, features and advantages of the present invention will become clear from the following description of the preferred embodiment with reference to the accompanying drawings.

DETAILED DESCRIPTION OF THE PREFERRED EMBODIMENTS

Figure 1:
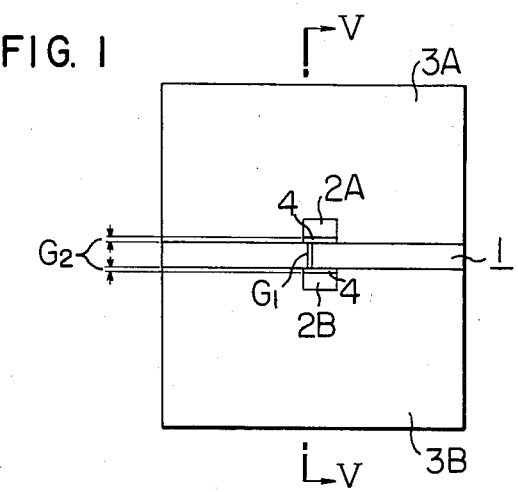
FIG. 1 is an illustration of a portion of a magnetic head means embodying the present invention to be engaged with a magnetic medium, as viewed in the direction of the line I—I in FIG. 5.

Referring first to FIG. 1, a magnetic head means in accordance with an embodiment of the present invention has a read-write magnetic head core 1 an eraser head cores 2A and 2B, as well as non-magnetic auxiliary plates 3A and 3B which hold these cores therebetween. For example, these auxiliary plates 3A and 3B are made of a ceramic material such as barium titanate $BaTiO_3$. Symbols $G_2$ and $G_1$ represent gap widths of an eraser gap and a read-write gap, respectively.

A brief explanation will be made hereinafter as to the process for producing conventional magnetic head means with specific reference to FIG. 2 which shows a cross-sectional view of a typical conventional magnetic head means. A read-write magnetic head core 1' is formed by connecting two core halves 1'A and 1'B each of which has substantially a letter C-like shape, in such a manner that each end of one arm of the core half is permeably abutted upon each other or magnetically connected by an I-shaped magnetic core and ends of the other arms of the core halves are slightly spaced from each other. The spaced portion is filled with a nonmagnetic material 5' such as glass. Therefore, a generally closed read-write magnetic head core 1' is obtained.

The read-write magnetic head core 1' is positioned in almost an abutting relation with the non-magnetic auxiliary plates 3'A and 3'B, and eraser head cores 2'A and 2'B are mounted on respective notches 31'A and 31'B provided in the non-magnetic auxiliary plates 3'A and 3'B. These members are adhered to one another by means of glass or resin and in predetermined positional relationships with one another. For obtaining the eraser gap width $G'_2$, non-magnetic members 4' and 4' having the same thickness as the eraser gap width $G'_2$ are adhered to respective side surface portions of the eraser head cores 2'A and 2'B facing the read-write magnetic head core 1' in advance to the adhering of these members. For example, such members 4 are made of glass.

Figure 2:
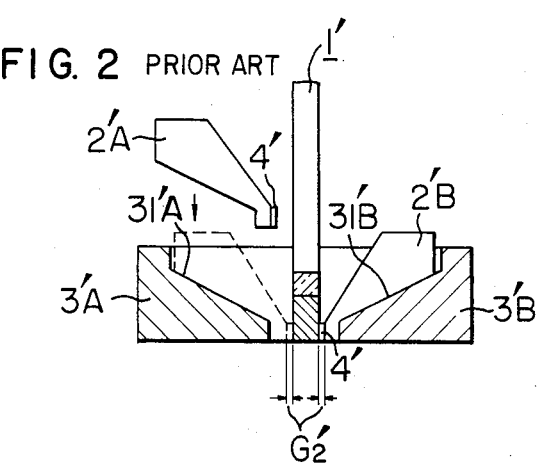
FIG. 2 is a cross-sectional view of a conventional magnetic head means.
Figure 3:
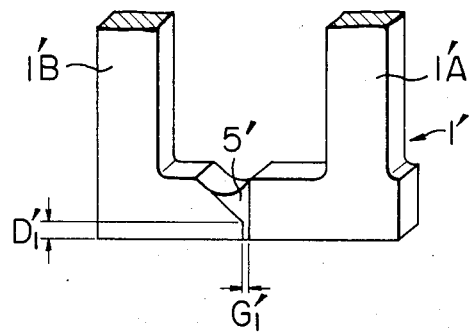
FIG. 3 is a perspective view of a read-write magnetic head core of the magnetic head means shown in FIG. 2.
Figure 4:
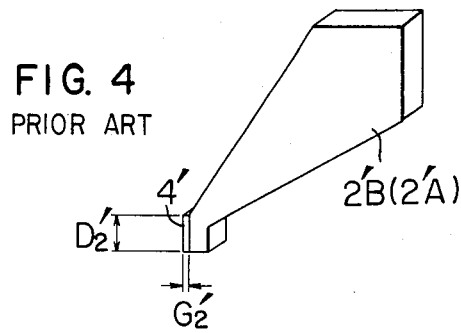
FIG. 4 is an enlarged perspective view of one of the eraser magnetic head cores of the magnetic head means shown in FIG. 2.

In the conventional magnetic head means as shown in FIG. 2, the width and the depth of the readwrite gap are defined by the sizes $G'_1$ and $D'_1$ of the non-magnetic member 5' respectively as shown in FIG. 3, while the width and the depth of the eraser gap are defined by the sizes $G'_2$ and $D'_2$ of the non-magnetic member 4' as shown in FIG. 4.

In the conventional magnetic head means having the aforementioned construction, the shape of the eraser head core is inevitably complicated because the eraser gap depth $D'_2$ is controlled by the shapes of the eraser head cores 2'A and 2'B. In addition, the eraser head core must have an extremely small size and the length of $D_2$ must be obtained precisely. For these reasons, it is quite difficult to produce the eraser head core by mechanical processing.

Figure 5:
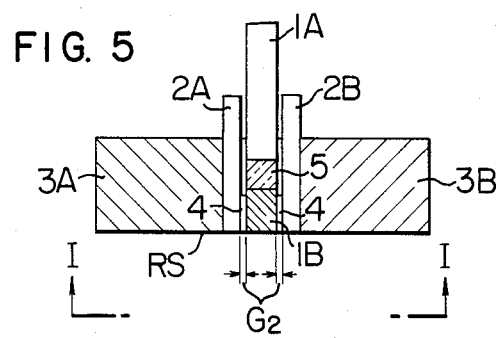
FIG. 5 is a cross-sectional view of the magnetic head means taken along the line V—V in FIG. 1.
Figure 7:
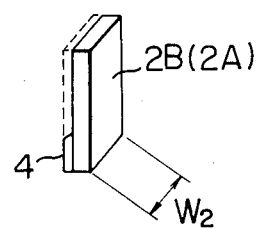
FIG. 7 is a perspective view of one of the eraser magnetic head cores of the magnetic head means shown in FIG. 1.

This difficulty, however, can be overcome by a magnetic head means embodying the present invention as shown in FIGS. 1 and 5. Namely, in this magnetic head means, the depth $D_2$ of the eraser gap is defined by the configuration of the core half 1A of the read-write magnetic head, while the depth $D_1$ of the read-write gap is defined by a distance between an end surface of the read-write head core half 1B and an end of a diagonally cut portion thereof as in the conventional case explained before in connection with FIG. 3. In this magnetic head means, since the depth $D_2$ of the eraser gap is defined by the shape of the read-write magnetic head core, the eraser head cores 2A and 2B may have substantially a square pillar shape as shown in FIG. 7.

Figure 6:
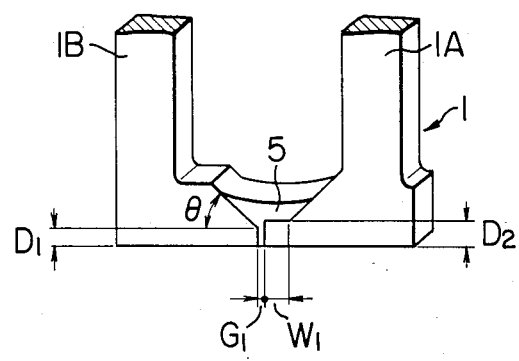
FIG. 6 is a perspective view of a read-write magnetic head core of the magnetic head means shown in FIG. 1.

Although the gap depth for an erasing effect is established by the read-wrie magnetic head core, the read-write gap depth may be defined to be equal or less than the eraser gap depth, i.e., $D_1 < D_2$, so that an extreme increase of the magnetic resistance is prevented. Accordingly no problem is caused from a read-write efficiency point of view. It has been confirmed also that a sufficient erasing effect is attainable even when the eraser gap depth $D_2$ is greater than the read-write gap depth $D_1$ by about 100 μm. In this magnetic head means, however, there remains a problem in noise generation due to mutual interference between the read-write magnetic head core and the erase head core which is caused by too closely access thereof. Such a noise generation problem caused by an erasion electric current can be eliminated by selecting a length $W_1$ of the flat portion of the shoulder of the read-write head core half 1A shown in FIG. 6 to be at least 1.5 times as large as the width $W_2$ of the eraser head core shown in FIG. 7, with an inclination angle $\theta$ of the diagonally cut portion of the read-write head core half 1B shown in FIG. 6 less than or equal to an angle of 50 degrees. The non-magnetic member 4 may be attached to the eraser head core to cover the entire surface thereof facing the read-write head core, as shown by broken line in FIG. 7, or to cover a part of the surface thereof, as shown by full line in FIG. 7. The eraser gap depth $D_2$ is entirely controlled by the read-write head core half 1A, so that the length of the non-magnetic member 4 attached to the eraser head core does have any effect upon the eraser gap depth $D_2$.

In addition, for aforementioned reasons a slight offset, on assembling, of the eraser head cores 2A and 2B from a reference plane RS also does have any effect on the eraser gap depth $D_2$, so that the assembling work is remarkably facilitated.

To the contrary, in conventional magnetic head means, the final eraser gap depth is largely affected by the offset of the eraser head cores from the reference plane RS, as well as by the dispersion of the size of eraser core end. Therefore, it is almost impossible to equalize the final gap depths of the eraser gaps in the final state of assembling. In this connection, according to the present invention it is quite possible to align the final eraser gap depths. The term "final gap depth" is used here to mean a depth as measured after the mechanical processing of the reference plane RS subsequent to assembling.

As has been described, in the magnetic head means of the present invention, the shape of the eraser core is greatly simplified because the eraser gap depth is controlled by the read-write core and, in addition, the depth of the eraser gap is not influenced by the degree of precision of the assembling of the magnetic head means, so that the production and the assembling of the magnetic head means are advantageously improved.

What is claimed is:

1. A read/write and trim erase magnetic head assembly comprising:
    a read/write magnetic head having a read/write magnetic core including a projecting portion establishing a read/write gap, said projecting portion having a predetermined height measured in the direction perpendicular to said read/write gap;
    a plurality of eraser magnetic heads abutting said read/write magnetic head, each of said eraser magnetic heads having a respective eraser magnetic core; and
    a plurality of non-magnetic predetermined thickness respectively disposed individually between said read/write magnetic head and each of said eraser magnetic heads,
    each of said eraser magnetic heads having an eraser gap of a width defined by the thickness of the respective non-magnetic member and a depth defined by said projecting portion height of said read/write magnetic core.

2. A magnetic head assembly according to claim 1, wherein said read/write magnetic core comprises two core halves, each of said core halves being generally C-shaped and having respective first ends permeably abutting each other, and respective second ends spaced from each other to define a read/write gap.

3. A magnetic head assembly according to claim 2, wherein said second end of one of said core halves includes a first wedge-shaped portion having a truncated tip establishing one side of said read/write gap, and said second end of the other one of said core halves includes a second wedge-shaped portion, wherein said projection portion comprises a rectangular projection formed at the tip of said second wedge-shaped portion for establishing the other side of said read/write gap, the depth of said eraser gap being defined by said projection height.

4. A magnetic head assembly according to claim 3, wherein said rectangular projection extends from the tip of said second wedge-shaped portion a distance at least 1.5 times the width of said eraser magnetic core, as measured parallel to a surface formed by the abutment of said read/write and eraser magnetic heads, and the inclination of said first wedge-shaped portion, as measured by an angle formed by said first wedge-shaped portion and a plane perpendicular to said truncated tip establishing said one side of said read/write gap, is less than or equal to 50 degrees.

5. A read/write and trimming magnetic head assembly comprising:
    a read/write magnetic head means for writing information on a moving recording medium surface to make a track and for reading the information, said read/write magnetic heads means including first and second read/write core members;
    a read/write gap being defined between said first and second read/write core members;
    a trimming head including trimming core members each having flat side walls, one of said side walls of each trimming core member being attached to said read/write magnetic head means at either side thereof through a non-magnetic material member; and a trimming gap for trimming said track at both sides thereof, said trimming gap being defined between said read/write magnetic head means and said one of said side walls of said trimming core member and having a depth extending perpendicular to said read/write gap, one of said read/write core members having a shoulder portion which is straddled by said trimming core members, said shoulder portion having a top surface parallel to and apart from said recording medium surface with (1) a first length which is substantially equal to a length of said trimming core, as measured with respect to the direction of movement of the recording medium, and (2) a second length, as measured in a direction perpendicular to said recording medium surface, defining the depth of said trimming gap.

6. A read/write and trimming magnetic head assembly according to claim 5, wherein said first length of said shoulder portion top shoulder is at least 1.5 times longer than said second length of said trimming core member.

* * * * *